United States Patent [19]

Vos

[11] Patent Number: 5,267,738
[45] Date of Patent: Dec. 7, 1993

[54] ROCKDRILL SEAL

[75] Inventor: Godfrey G. Vos, Bedfordview, South Africa

[73] Assignee: Ingersoll-Rand Company, Woodcliff Lake, N.J.

[21] Appl. No.: 900,382

[22] Filed: Jun. 18, 1992

[30] Foreign Application Priority Data

Apr. 29, 1992 [ZA] South Africa .................. 92/3129

[51] Int. Cl.⁵ .............................................. F16J 15/10
[52] U.S. Cl. ................................... 277/168; 277/171
[58] Field of Search ............... 277/168, 169, 170, 171, 277/178, 179, 188 R

[56] References Cited

U.S. PATENT DOCUMENTS

| | | | |
|---|---|---|---|
| 1,715,854 | 6/1929 | McKenzie-Martyn | 277/171 X |
| 2,862,736 | 12/1958 | Russell | 277/169 |
| 2,898,134 | 8/1959 | Moskow | 277/188 R |
| 3,041,077 | 6/1962 | Osterloh et al. | 277/178 X |
| 3,915,461 | 10/1975 | Gautier | 277/171 X |
| 4,013,373 | 3/1977 | Lemprecht et al. | 277/178 X |
| 4,298,204 | 11/1981 | Jinkins | 277/171 X |
| 4,676,143 | 6/1987 | Nomura et al. | 277/169 X |
| 5,050,892 | 9/1991 | Kawai et al. | 277/168 |

FOREIGN PATENT DOCUMENTS

| | | | |
|---|---|---|---|
| 1048081 | 9/1953 | Fed. Rep. of Germany | 277/171 |
| 74/7859 | 11/1975 | South Africa . | |
| 76/4349 | 6/1977 | South Africa . | |
| 76/6739 | 9/1977 | South Africa . | |
| 77/0963 | 11/1977 | South Africa . | |
| 76/5086 | 12/1977 | South Africa . | |
| 77/2675 | 2/1978 | South Africa . | |
| 77/7384 | 9/1978 | South Africa . | |
| 78/2232 | 7/1979 | South Africa . | |
| 78/6263 | 8/1979 | South Africa . | |
| 79/4759 | 7/1980 | South Africa . | |
| 79/5943 | 9/1980 | South Africa . | |
| 80/6669 | 9/1981 | South Africa . | |
| 81/4450A | 6/1982 | South Africa . | |
| 82/5187 | 8/1983 | South Africa . | |
| 85/0871 | 9/1983 | South Africa . | |
| 83/5449 | 3/1984 | South Africa . | |
| 83/6098 | 3/1984 | South Africa . | |
| 83/6279 | 3/1984 | South Africa . | |
| 83/9374 | 7/1984 | South Africa . | |
| 86/1965 | 9/1986 | South Africa . | |
| 89/3759 | 11/1989 | South Africa . | |
| 89/0092 | 7/1990 | South Africa . | |

*Primary Examiner*—William A. Cuchlinski, Jr.
*Assistant Examiner*—Scott W. Cummings
*Attorney, Agent, or Firm*—John J. Selko

[57] ABSTRACT

A deformable seal element is installed in a seal groove to thereby form a completed seal between static components being the housing of a rockdrill and an insert in the housing. The seal element is deformed to assume the shape of the seal groove. A rib in the seal groove digs into the seal element, whereby axial movement or dither of the seal element in the seal groove is restrained.

9 Claims, 3 Drawing Sheets

ROCKDRILL SEAL

BACKGROUND OF THE INVENTION

This invention relates generally to rockdrills, more particularly rockdrills operable by a fluid under pressure. Still more particularly the invention relates to a seal for sealing one or more fluid pressure chambers defined between at least two static components of a rockdrill operable by a fluid under pressure.

In hydraulically operable rockdrills pressure reversals and fluctuations occur to cause reciprocation of the piston in the drill. The seals used to seal the various chambers defined between static components in the rockdrill, such as the drive chamber, the return chamber, the cushion chamber, etc., when subjected to these pressure reversals can cause the seals to move or dither in their respective grooves. Such movement results in wear of the parts contacted by the seals and failure of the rockdrill. This wear is aggravated when the operating fluid is contaminated with fine abrasive particles. This is often the case in an underground mining environment were handheld hydraulic drills using emulsion fluids or plain water as an operating fluid are being used. The frequent disconnection and reconnection of drills from the pressure source which are necessary when removing drills from the rock face during blasting operations, as well as the reticulation piping extensions as the mine face moves further away from the pressure source, are known sources of contaminant ingress. The abrasive particles are very often too small to be removed from the system by filters.

Seals presently known in the art consist of 0-ring seals or square section seals or crush type seals which are seated in seal grooves of rectangular cross-section. Many of these seals rely on filling the seal groove completely to be effective. This is difficult to achieve due to the size variations resulting from tolerance effects during manufacture.

It is an object of the invention to overcome or at least to alleviate the disadvantages of seals in accordance with the presently known art, more particularly, to overcome dithering of seals in seal grooves.

The foregoing illustrates limitations known to exist in present hydraulic rockdrills. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

According to the invention there is provided a seal for sealing a fluid pressure chamber defined between at least two static components of a rockdrill operable by a fluid under pressure, the seal including:

a groove recessed into at least one of the components;

the groove being shaped to receive a deformable seal element therein; and the groove having a formation which deforms the seal element when the seal element is compressed into the groove and which restrains the seal element against movement in the groove.

The groove may have a plurality of faces and the formation may be a rib constituting at least one of the faces of the groove. The cross-sectional profile may include an obtuse angle. Still further, at least one rounded corner may be included in the cross-section profile.

The formation may restrain the seal element, when compressed into the groove, against axial movement in the groove.

One of the static components may be of a cylindrical shape, and the groove may be annular in shape and may be radially recessed into the periphery of the component.

Alternatively, one of the static components may be of a tubular shape, and the groove may be of an annular shape which is radially recessed into the bore of the component.

The invention further extends to a seal in accordance with the invention and including a deformable seal element in the groove.

The groove may be of a circular annular shape, and the seal element may likewise be of a circular annular shape. In this arrangement the seal element may have one radial dimension corresponding to the radial dimension of the formation. Thus, for example, the internal radial dimension of the seal element may correspond to the radius of the formation.

BRIEF DESCRIPTION OF THE DRAWING FIGURES

DETAILED DESCRIPTION

Figure 1:
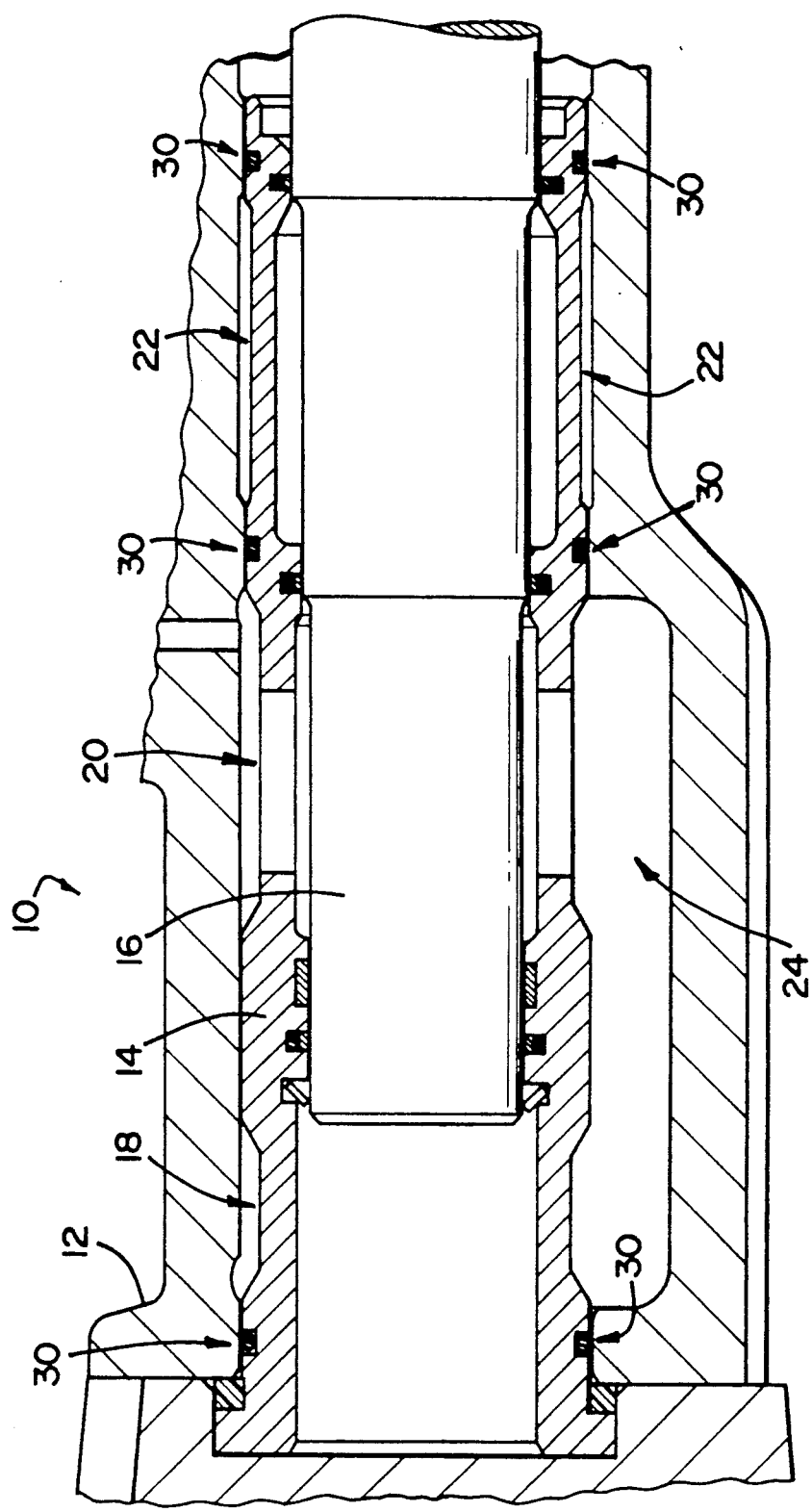
FIG. 1 is a fragmentary longitudinal sectional view of a hydraulically operable rockdrill incorporating a seal in accordance with the invention.

Referring to FIG. 1, reference numeral 10 indicates the rockdrill in general. It includes a housing 12 and a tubular insert 14 in the bore of the housing. Both components 12 and 14 are static. Reference numeral 16 shows a piston for the rockdrill 10. The piston 16 is reciprocable in the bore of the insert 14. Various fluid pressure chambers 18, 20, 22 and 24 are defined between the housing 12 and the insert 14. During operation of the rockdrill 10 hydraulic fluid under pressure is contained in these chambers during various stages of the operation of the drill.

In order to seal the pressure chambers 18, 20, 22 and 24, seals 30 in accordance with the invention are provided. The seals 30 are shown in greater detail in FIGS. 5 and 6, and details of the seal groove are shown in FIGS. 2 to 4.

Figure 2:
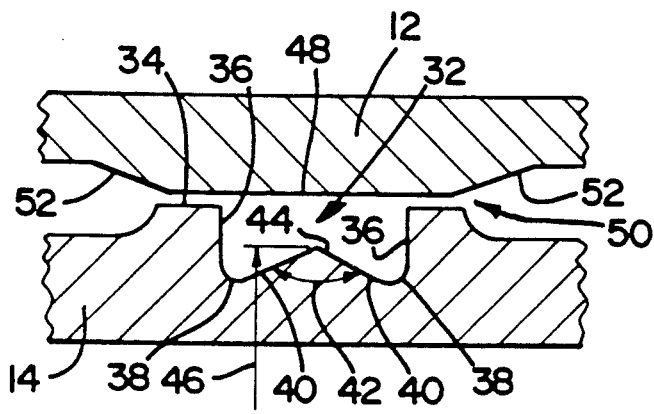
FIG. 2 is a diagrammatic cross-sectional view on an enlarged scale of a seal groove of the seal shown in FIG. 1.

Referring to FIG. 2, a seal groove 32 is shown in the insert 14. The seal groove 32 is annular in shape and is recessed into the periphery 34 of the insert 14. The groove 32 has parallel straight sides 36, two rounded corners 38, and two sloping faces 40. The sloping faces 40 define between them an obtuse angle 42 and form a rib 44 having a radius 46. Between the bore 48 of the housing 12 and the periphery 34 of the insert 14 there is defined a radial gap 50. Sloping faces 52 are provided on the inner periphery of the housing 12.

Figure 3:
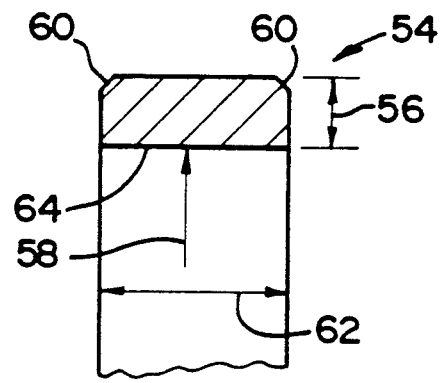
FIG. 3 is a fragmentary cross-sectional view on an enlarged scale of a seal element incorporated in the rockdrill shown in FIG. 1 before being introduced into the seal groove.

Referring to FIG. 3, a seal element 54 is shown. The seal element is of annular shape and has a radial thickness 56 and an inner radius 58. It has chamfered corners 60. The seal element has a width 62. The seal element is of ultra high molecular weight polyethylene or of synthetic rubber or of polyurethane of a suitable hardness, for example 90 durometer. The radius 58 of the inner periphery 64 of the seal element 54 is approximately the same as the radius 46 of the rib 44 in the groove 32 shown in FIG. 2. The width 62 of the seal element 54 is slightly less than the width of the seal groove 32 shown in FIG. 2. The seal thickness 56 is such that the total volume of the seal element 54 is as close as possible to the volume of the seal space defined between groove 32 and the bore 48 of the housing 12. The chamfered corners 60 of the seal element 54 facilitate installation of the seal element in the groove 32 shown in FIG. 2.

Figure 4:
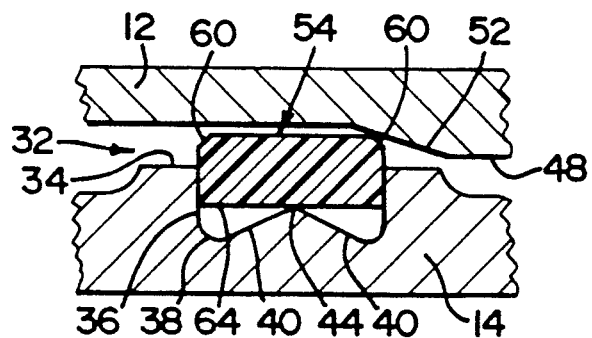
FIG. 4 shows the seal element of FIG. 1 in position in the seal groove of FIG. 2 but before being compressed.

Referring to FIG. 4, the first stage of the installation of the seal element 54 shown in FIG. 3 into the seal groove 32 shown in FIG. 2, is shown. The seal element 54 is stretched over the periphery 34 of the insert 14 and positioned over the rib 44 in the seal groove 32. A seal compression tool (not shown) may be used when the seal element 54 is of a material with insufficient memory, to pre-compress the seal into the groove 32 prior to final installation in the housing. During this first stage of installation the housing 12 is slid axially over the seal element 54 with the sloping faces 52 pressing against the chamfered corners 60 of the seal element 54, thereby compressing the seal element in the groove 32.

Figure 5:
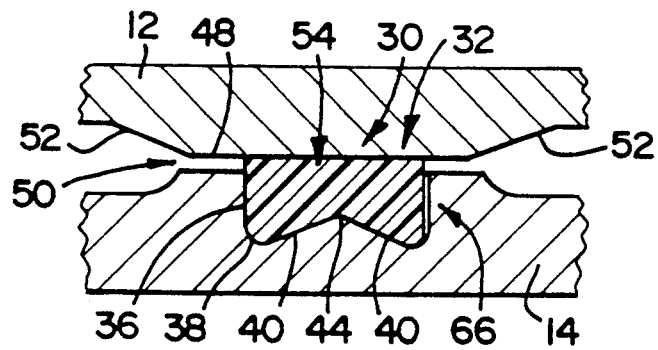
FIGS. 5 and 6 show the seal element of FIG. 4 after being fully installed in the seal groove.

Referring to FIG. 5, the seal element 54 is shown finally installed in the seal groove 32 to thereby form a completed seal 30 between the housing 12 and the insert 14. As can be seen, the seal element 54 is deformed to assume the shape of the seal groove 32. Since the rib 44 digs into the seal element 54, axial movement or dither of the seal element 54 in the seal groove 32 is restrained. Because the leading edge of the seal element 54 can be deflect into the seal groove 32 until it contacts the faces 40 of the rib 44, installation forces are less than for a seal that has to be crushed into position. If the seal element 54 has a total material volume less than the space volume of the seal groove 32, a small gap 66 may exist. This will have negligible effect on seal dither as any seal movement will tend to increase the seal contact pressure with the housing bore 48 due to the sloping faces 40 of the rib 44.

Figure 6:
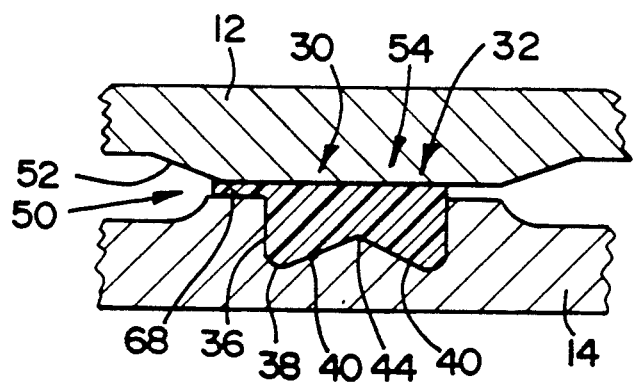

Referring to FIG. 6, the seal element 54 is shown with a total material volume greater than the space volume of the seal groove 32. This results in excess material 68 being forced by the housing bore 48 into the radial gap 50. Provided that the excess volume is not too great, no detrimental effect will result.

Figure 7:
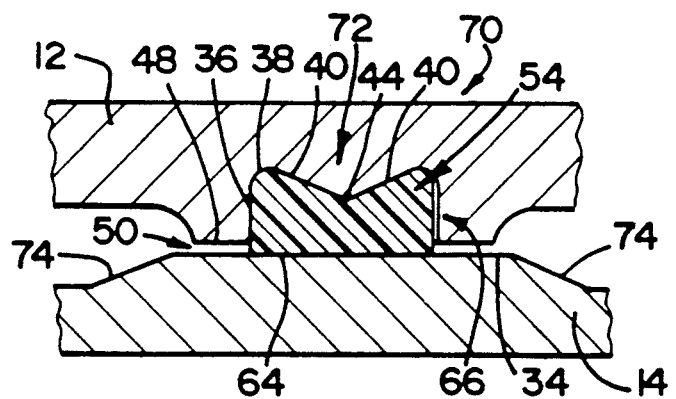
FIG. 7 shows a seal similar to the seal shown in FIG. 4, but with the seal groove being provided in the other component.

Referring to FIG. 7, there is shown an alternative seal 70 to that shown in FIGS. 5 and 6. The seal 70 comprises a seal groove 72 recessed into the bore 48 of the housing 12. The seal groove 72 is of the same configuration as the seal groove 32 shown in FIGS. 2, 4, 5 and 6. In this arrangement sloping faces 74 are provided on the periphery 34 of the insert 14. The seal element 54 is installed in the seal groove 72 in a manner similar to that described with reference to FIGS. 4 and 5. If the radius 58 of the inner periphery 64 of the seal element 54 as shown in FIG. 3 is the same as the radius of the periphery 34 of the insert 14, it has the advantage over the arrangement shown in FIG. 1 that the seal element 54 need not be stretched and pre-compressed to position it in the seal groove 72 prior to installation.

One advantage of a seal in accordance with the invention is that it resists dithering of the seal element in the seal groove, even when the seal element material volume is less than the seal groove space volume.

A further advantage of a seal in accordance with the invention is that it is easier to install than presently known crush type seals.

A still further advantage of a seal in accordance with the invention is that the seal can be used in cases where wear of the seal groove and of the mating face has already occurred by deepening the seal groove to the proposed shape.

Having described the invention, what is claimed is:

1. A seal for sealing a fluid pressure chamber defined between at least two static components of a rockdrill operable by a fluid under pressure, the seal including:
   a groove recessed into a first of the static components;
   the groove being shaped to receive a deformable seal element therein;
   the groove having a formation which deforms the seal element when the seal element is compressed into the groove and which restrains the seal element against movement in the groove;
   a second of the static components having a pair of sloping faces spaced apart axially along the static component, with a flat land surface therebetween, for contact with the seal element;
   the deformable seal element having an inner surface contacting the groove formation and an outer surface contacting the land surface, the seal element having a pair of chamfered corners on the outer surface adapted to contact the sloping faces of the second static component, during assembly of the first and second static components; and
   the volume of the deformable seal element being approximately equal to a seal space defined by the groove in one static component and the oppositely spaced flat land surface on the remaining static component.

2. A seal as claimed in claim 1, in which:
   the groove has a plurality of faces; and
   the formation is a rib constituting at least one of the faces of the groove.

3. A seal as claimed in claim 2, in which:
   the rib has an angular cross-sectional profile and constitutes two of the faces of the groove.

4. A seal as claimed in claim 3, in which the cross-sectional profile of the rib includes an obtuse angle.

5. A seal as claimed in claim 1, in which:
   the groove has a cross-sectional profile which includes at least one rounded corner.

6. A seal as claimed in claim 1, in which:
   the formation restrains the seal element, when compressed into the groove, against axial movement in the groove.

7. A seal as claimed in claim 1, in which:
   one of the static components is of a cylindrical shape; and
   the groove is of an annular shape and is radially recessed into the periphery of the component.

8. A seal as claimed in claim 1, in which:
   one of the static components is of a tubular shape; and
   the groove is of an annular shape and is radially recessed into the bore of the component.

9. A seal as claimed in claim 1, in which:
   the groove is of a circular annular shape;
   the seal element is of a circular annular shape; and
   the seal element has one radial dimension corresponding to the radial dimension of the formation.

* * * * *